United States Patent
Lee et al.

(10) Patent No.: US 11,290,590 B2
(45) Date of Patent: Mar. 29, 2022

(54) METHOD AND SYSTEM FOR DISTRACTION MANAGEMENT OF CONTEXT-AWARE RULE-BASED SMART DEVICE

(71) Applicant: Korea Advanced Institute of Science and Technology, Daejeon (KR)

(72) Inventors: Uichin Lee, Daejeon (KR); Inyeop Kim, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 0 days.

(21) Appl. No.: 17/105,836

(22) Filed: Nov. 27, 2020

(65) Prior Publication Data

US 2021/0160362 A1 May 27, 2021

(30) Foreign Application Priority Data

Nov. 27, 2019 (KR) .................. 10-2019-0154297
Mar. 26, 2020 (KR) .................. 10-2020-0036824

(51) Int. Cl.
*H04M 1/72463* (2021.01)
*H04M 1/72454* (2021.01)

(52) U.S. Cl.
CPC ... *H04M 1/72463* (2021.01); *H04M 1/72454* (2021.01)

(58) Field of Classification Search
CPC ......... H04M 1/72463; H04M 1/72454; H04M 1/72451
See application file for complete search history.

(56) References Cited

U.S. PATENT DOCUMENTS

| | | | |
|---|---|---|---|
| 9,125,144 B1* | 9/2015 | Orbach | H04W 40/18 |
| 2016/0255188 A1* | 9/2016 | Chaudhri | H04M 1/72451 |
| | | | 715/728 |
| 2017/0099382 A1* | 4/2017 | Cardonha | H04W 4/08 |
| 2017/0134564 A1* | 5/2017 | Almurayh | H04M 1/72457 |
| 2019/0069261 A1* | 2/2019 | Nygren | H04W 76/30 |
| 2021/0051226 A1* | 2/2021 | Ko | H04M 1/72454 |

* cited by examiner

*Primary Examiner* — Minjung Kim
(74) *Attorney, Agent, or Firm* — Christensen O'Connor Johnson Kindness PLLC

(57) ABSTRACT

Disclosed are a method and apparatus for managing a distraction to a smart device based on a context-aware rule. A method of managing a distraction to a smart device based on a context-aware rule, in the present disclosure, includes the steps of setting a context-aware distraction management rule, collecting context information for applying a distraction management mode based on the set context-aware distraction management rule, determining whether to set a distraction management mode and setting the distraction management mode, collecting context information for releasing the set distraction management mode, and determining whether to release the setting of the distraction management mode and releasing the distraction management mode.

8 Claims, 6 Drawing Sheets

FIG. 6

[Guide]

If a set rule is applied, notification may not continue to be received after 20:00. Do you want to set a condition for releasing a distraction management mode again?

Yes   No (a)

[Guide]

There is a good possibility that a condition for a set rule may not occur. Do you want to change a condition in which notification is received on silent when it is received at 12:00 to a condition in which Yes   No (b)

METHOD AND SYSTEM FOR DISTRACTION MANAGEMENT OF CONTEXT-AWARE RULE-BASED SMART DEVICE

CROSS-REFERENCES TO RELATED APPLICATIONS

This application is based on and claims priority under 35 U.S.C. 119 to Korean Patent Application No. 10-2019-0154297, filed on Nov. 27, 2019 and Korean Patent Application No. 10-2020-0036824, filed on Mar. 26, 2020 in the Korean intellectual property office, the disclosures of which are herein incorporated by reference in their entireties.

TECHNICAL FIELD

The present disclosure relates to a method and system for managing a distraction to a smart device based on a context-aware rule, for reducing a distraction which may occur due to a smart device in a context that should not be disturbed in everyday life.

BACKGROUND OF THE INVENTION

A smart device including a smartphone has a convenient and useful function and provides a user with a variety of types of content that provide pleasure without restriction, but also has a negative effect in that attention dispersion or an interruption occurs. An interruption may occur in a situation in which a user or surrounding people located on the periphery of the user and having a situation similar to that of the user concentrate on or immerse in a given activity. An interruption may apply interference with an activity that is concentrated or immersed. An interruption may occur due to information transmitted from the outside to a user through a smart device. This may include external notification and a received call (external interruption).

Furthermore, an interrupted situation may include a situation in which a user does not immerse in major activities because the user autonomously attempts to use a smart device while immersing into any activity. Interference with the activities of surrounding people of a user attributable to noise and light occurring in a smart device may also be called an interruption.

Recent research results show that such an interruption has a negative influence on an achievement level of a task, and may also have a negative influence on various fields in everyday life (e.g., low productivity in an office worker, low academic achievement in students, a sleep disorder, and low quality in a social interaction such as dialogues).

In order to handle an interruption which may occur due to smart devices, several application programs are developed and downloaded through an app store. In such application programs, a representative method provided to a user in order to handle an interruption is to set a "distraction management mode."

The distraction management mode means that a smart device operation method is changed to a method set by a user in order to arbitrate all interruptions which may occur due to a smart device and which may interfere with an immersed activity in the situation in which a user and surrounding people having a situation similar to that of the user must immerse in the activity. A representative distraction management mode is to silence or not display external notification or to restrict the use of a smartphone.

In general, the "distraction management mode" is directly set or released by a user in the situation in which concentration is necessary. However, a method for a user to directly set or release the distraction management mode may be inconvenient because the user must directly activate/deactivate the distraction management mode manually whenever a situation in which the distraction management mode is necessary occurs.

Furthermore, the existing method of setting the distraction management mode has low usability due to insufficient flexibility for interruption handling because a function for setting the distraction management mode based on the requirements of a user is not provided. For example, a student has to search for required information while studying, but may not use a smartphone because the distraction management mode in which the smartphone cannot be used has been set or may not be aware of a contact from an important person although the contact was received. Accordingly, it is very important to develop a technology for effectively handling a daily life interruption occurring due to a smart device.

In the existing research in which services supporting the distraction management mode by recognizing a user's context were developed, only a context condition (place and time) having a limited range was taken into consideration. The existing research had limitations in that a user could select a method of setting the distraction management mode and only the distraction management mode based on a block (all types of notification were blocked and the use of an application program is impossible) was provided. Furthermore, the existing research had inconvenience because a user had to directly release the distraction management mode.

The existing smart device operating system provides a do-not-disturb mode, but basically, a user has to manually set or release the do-not-disturb mode whenever a situation in which concentration is necessary occurs and automatic activation/deactivation can be automatically set based on time or place only. Furthermore, a setting function, such as selectively receiving or blocking specific notification, is limited.

Such distraction management modes may be considered as having low usefulness and usability because a user cannot flexibly set a distraction management rule and a situation in which a user must intervene frequently occurs.

Recently, there is provided a rule-based service for automatically recommending a device setting change rule by analyzing a smart device use pattern and situation. However, it is difficult for a user to be accurately aware of when the rule will be applied or released because only a condition in which rule setting is applied is specified and a condition in which rule setting is released is not clearly specified for the user. Furthermore, a situation in which the rule is applied/released may occur in an unexpected situation.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An object of the present disclosure is to provide a method and system for arbitrating a distraction occurring in a smart device using a distraction management mode based on a context-aware rule.

In one aspect, a method of managing a distraction to a smart device based on a context-aware rule, which is in the present disclosure, includes the steps of setting a context-aware distraction management rule, collecting context information for applying a distraction management mode based on the set context-aware distraction management rule, determining whether to set a distraction management mode and setting the distraction management mode, collecting context information for releasing the set distraction management mode, and determining whether to release the setting of the distraction management mode and releasing the distraction management mode.

The step of setting the context-aware distraction management rule includes the steps of setting a condition in which a distraction management mode is applied by selecting one or more context information items to which the distraction management mode is automatically applied and setting a condition in each of the selected items, selecting a distraction management mode to be applied when the set condition is satisfied, setting a condition in which the distraction management mode is released, for returning the state in which the selected distraction management mode has been applied to a state before the selected distraction management mode was applied, and verifying the condition for applying or releasing the distraction management mode and transmitting a result of the verification to a user.

In the step of setting the condition in which the distraction management mode is applied, the context information item includes one or more state conditions or event conditions, the state condition or event condition includes detailed attributes, a detailed condition in which the distraction management mode is applied is set based on the detailed attributes, and a branch condition in which the distraction management mode is differently applied is set based on the detailed condition.

The step of determining whether to set the distraction management mode and setting the distraction management mode includes determining whether the collected context information for applying the distraction management mode and the condition in which the distraction management mode based on the set distraction management rule is applied are identical, maintaining the step of collecting context information for applying the distraction management mode when the collected context information and the condition are not identical, and setting the distraction management mode when the collected context information and the condition are identical.

The step of determining whether to release the setting of the distraction management mode and releasing the distraction management mode includes determining whether the collected context information for releasing the distraction management mode and the condition in which the distraction management mode based on the set distraction management rule is released, maintaining the step of collecting context information for releasing the distraction management mode when the collected context information and the condition are not identical, and releasing the distraction management mode when the collected context information and the condition are identical.

In another aspect, an apparatus for managing a distraction to a smart device based on a context-aware rule, which is in the present disclosure, includes a distraction management rule setting unit setting a context-aware distraction management rule, an information collection unit collecting context information for applying a distraction management mode based on the set context-aware distraction management rule, and a distraction management mode setting and release unit determining whether to set and release a distraction management mode and setting and releasing the distraction management mode.

According to various embodiments of the present disclosure, a user can effectively handle a distraction which may occur due to a smart device without inconvenience in directly changing the setting of the smart device in a situation in which concentration and immersion are necessary because the user can directly set a desired context-aware-based distraction management rule and a system automatically executes a distraction management mode based on the distraction management rule set by the user. Accordingly, the user can effectively block only a distracted element while using a proper function unique to the smart device without any change and maintaining high productivity.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is a diagram for describing an example in which information is presented to a user after a distraction management rule is reviewed according to an embodiment of the present disclosure.

DETAILED DESCRIPTION

While illustrative embodiments have been illustrated and described, it will be appreciated that various changes can be made therein without departing from the spirit and scope of the invention.

"Context-aware" means that a system is aware of information related to a context of a user. A distraction management mode may be automatically set by recognizing the context of the user.

According to an embodiment of the present disclosure, a user may directly set a context condition in which a "distraction management mode is set" and a "distraction management mode operation" through a system. The system automatically changes a mode to a distraction management mode set by a user in a context condition in which the distraction management mode set by the user is applied.

Furthermore, the "release of distraction management mode setting" may be taken into consideration. The release of distraction management mode setting means that the setting of a smart device is returned from the state in which a distraction management has been set in the smart device of a user to the state before the distraction management was set. The user may directly set a condition in which the distraction management mode is released. The reason why the release of distraction management mode setting is necessary is that if the distraction management mode is not released in a situation in which a distraction which may occur due to the smart device no longer needs to be arbitrated, unwanted inconvenience may occur because the use of the smart device by the user is restricted.

In other words, a distraction management rule may be configured with "context-aware", "distraction management mode setting", and "distraction management mode release." A system based on the distraction management rule is aware of a context of a user, and then the distraction management mode setting and the distraction management mode release are automatically applied. The user may precisely set a condition in which a distraction management mode is set and a condition in which the distraction management mode is released based on his or her requirements. The system may review whether a distraction management rule written by the user correctly operates in a field, may present results to the user, and may suggest a modification. The user may accept the suggestion of the system and modify and supplement the distraction management rule. Hereinafter, embodiments of the present disclosure are described in detail with reference to the accompanying drawings.

Figure 1:
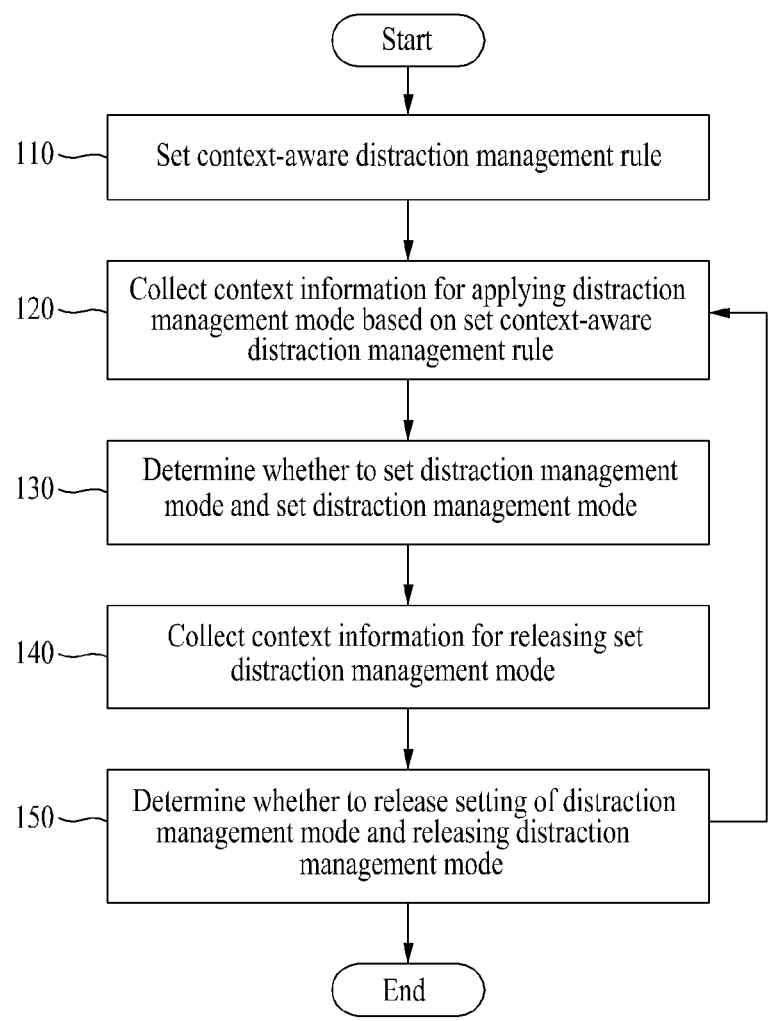
FIG. 1 is a diagram for describing a method of managing a distraction to a smart device based on a context-aware rule according to an embodiment of the present disclosure.

FIG. 1 is a diagram for describing a method of managing a distraction to a smart device based on a context-aware rule according to an embodiment of the present disclosure.

The disclosed method of managing a distraction to a smart device based on a context-aware rule includes step 110 of setting a context-aware distraction management rule, step 120 of collecting context information for applying a distraction management mode based on the set context-aware distraction management rule, step 130 of determining whether to set a distraction management mode and setting the distraction management mode, step 140 of collecting context information for releasing the set distraction management mode, and step 150 of determining whether to release the setting of the distraction management mode and releasing the distraction management mode.

At step 110, a context-aware distraction management rule is set. First, a condition in which a distraction management mode is applied is set by selecting one or more context information items to which a distraction management mode will be automatically applied and setting a condition on each of the selected items. The context information item includes one or more state conditions or event conditions. The state condition or the event condition includes detailed attributes. A detailed condition in which a distraction management mode is applied is set based on the detailed attributes. A branch condition in which a distraction management mode is differently applied is set based on the detailed condition.

When the set condition is satisfied, a distraction management mode to be applied is selected. Thereafter, a condition in which the distraction management mode is released, for returning the state in which the selected distraction management mode has been applied to the state before the selected distraction management mode was applied, is set. The conditions in which the distraction management mode is applied and released are verified, and are delivered to a user.

At step 120, context information for applying a distraction management mode is collected based on the set context-aware distraction management rule.

This step is the step of collecting context information corresponding to a condition set by a user at step 210 using a sensor mounted on a smart device and an application programming interface (API) (i.e., application program programming interface).

The context information of the user may include the following information: time, a place, an activity being performed by the user, an interaction state between the user and a smart device, the physical state of the smart device, the environment setting state of the smart device, the state in which another device is used, and the social interaction state of the user.

A method of inferring user context information may include the following method: A place may be inferred using the following methods: indoor localization, a Wi-Fi fingerprint method, a method using a beacon, a method using a Bluetooth connection (e.g., within a vehicle), and a method using GPS signals.

An activity being performed by a user may be inferred through a sensor mounted on a smart device and a user behavior prediction model (machine learning). A user and smart device interaction state (application program use history and user interface interaction, such as a screen touch) may be collected using a library API provided by the operating system of a smart device.

The physical state of a smart device may be inferred through a sensor (may include an acceleration sensor and a gyro sensor) mounted on a smart device, or a physical separation state between a smart device and a user may be inferred through a method using a device having means capable of communicating with the smart device and being worn by the user.

The environment setting state of a smart device may be collected using an API provided by the operating system of the smart device.

The social interaction state of a user may be inferred through search for others' smart devices connected to Wi-Fi, search for peripheral Bluetooth devices, or a noise sensor. Whether an event has occurred, such as whether external notification or call has been received by a smart device, whether the amount of the smart device used/frequency of use pre-defined by a user has been exceeded or the amount of application program (application) used/frequency of use pre-defined by a user has been exceeded, may be tracked using an API provided by the operating system of a smart device.

At step 130, whether to set a distraction management mode is determined, and the distraction management mode is set. Whether the collected context information for applying a distraction management mode and a condition in which a distraction management mode based on the set distraction management rule is applied are the same is determined. The step of collecting context information for applying a distraction management mode is maintained when the collected context information and the condition are not the same. The distraction management mode is set when the collected context information and the condition are the same.

This step is the step of determining whether the context information of the user collected at step 120 and the condition in which a distraction management mode is applied, set by the user at step 210, are the same and setting a distraction management mode.

When the collected context information of the user and the condition in which a distraction management mode is applied, defined by the user, are not the same, the system remains in step 120 and continues to collect context information of the user.

When the collected context information of the user and the condition in which a distraction management mode is applied, defined by the user, are the same, the system sets a distraction management mode.

At step 140, context information for releasing the set distraction management mode is collected.

This step is the step of collecting context information using a sensor mounted on the smart device and a library provided by the operating system of the smart device in the state in which the distraction management mode applied at step 130 has been set. A method of collecting and inferring a user state and event is the same as the method of step 120.

At step 150, whether to release the setting of the distraction management mode is determined, and the distraction management mode is released. Whether the collected context information for releasing the distraction management mode and a condition in which the distraction management mode based on the set distraction management rule is released are the same is determined. The step of collecting context information for releasing the distraction management mode is maintained when the collected context information and the condition are not the same. The distraction management mode is released when the collected context information and the condition are the same.

This step is the step of checking whether the context information of the user collected at step 140 and a condition in which a distraction management mode set by the user at step 230 is released are the same. When the collected context information of the user and the condition in which the distraction management mode is released, defined by the user, are not the same, the system remains in step 140 and continues to collect context information of the user.

When the collected context information of the user and the condition in which the distraction management mode is released, defined by the user, are the same, the system releases the distraction management mode.

At step 150, whether to release the setting of the distraction management mode is determined. After the distraction management mode is released, the process may move to step 120 of collecting context information for applying a distraction management mode based on the set context-aware distraction management rule again.

Figure 2:
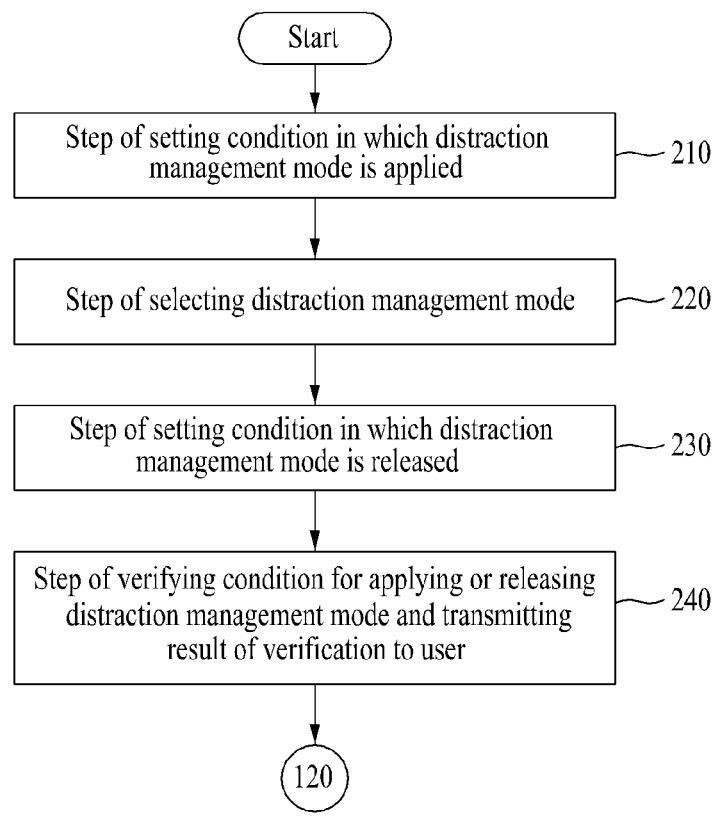
FIG. 2 is a diagram for describing a process of setting a context-aware distraction management rule according to an embodiment of the present disclosure.

FIG. 2 is a diagram for describing a process of setting a context-aware distraction management rule according to an embodiment of the present disclosure.

The step of setting a context-aware distraction management rule according to an embodiment of the present disclosure is the step of directly setting, by a user, a distraction management rule. The user may set the rule using a graphical user interface (GUI).

As described above, the step of setting a context-aware distraction management rule may include step 210 of setting a condition in which a distraction management mode is applied by selecting one or more context information items to which a distraction management mode is automatically applied and setting a condition in each of the selected items, step 220 of selecting a distraction management mode to be applied when the set condition is satisfied, step 230 of setting a condition in which the distraction management mode is released, for returning the state in which the selected distraction management mode has been applied to the state before the selected distraction management mode was applied, and step 240 of verifying the condition for applying or releasing the distraction management mode and transmitting a result of the verification to a user.

At step 210, a condition in which a distraction management mode is applied is set by selecting one or more context information items to which a distraction management mode is automatically applied and setting a condition in each of the selected items.

Figure 3:
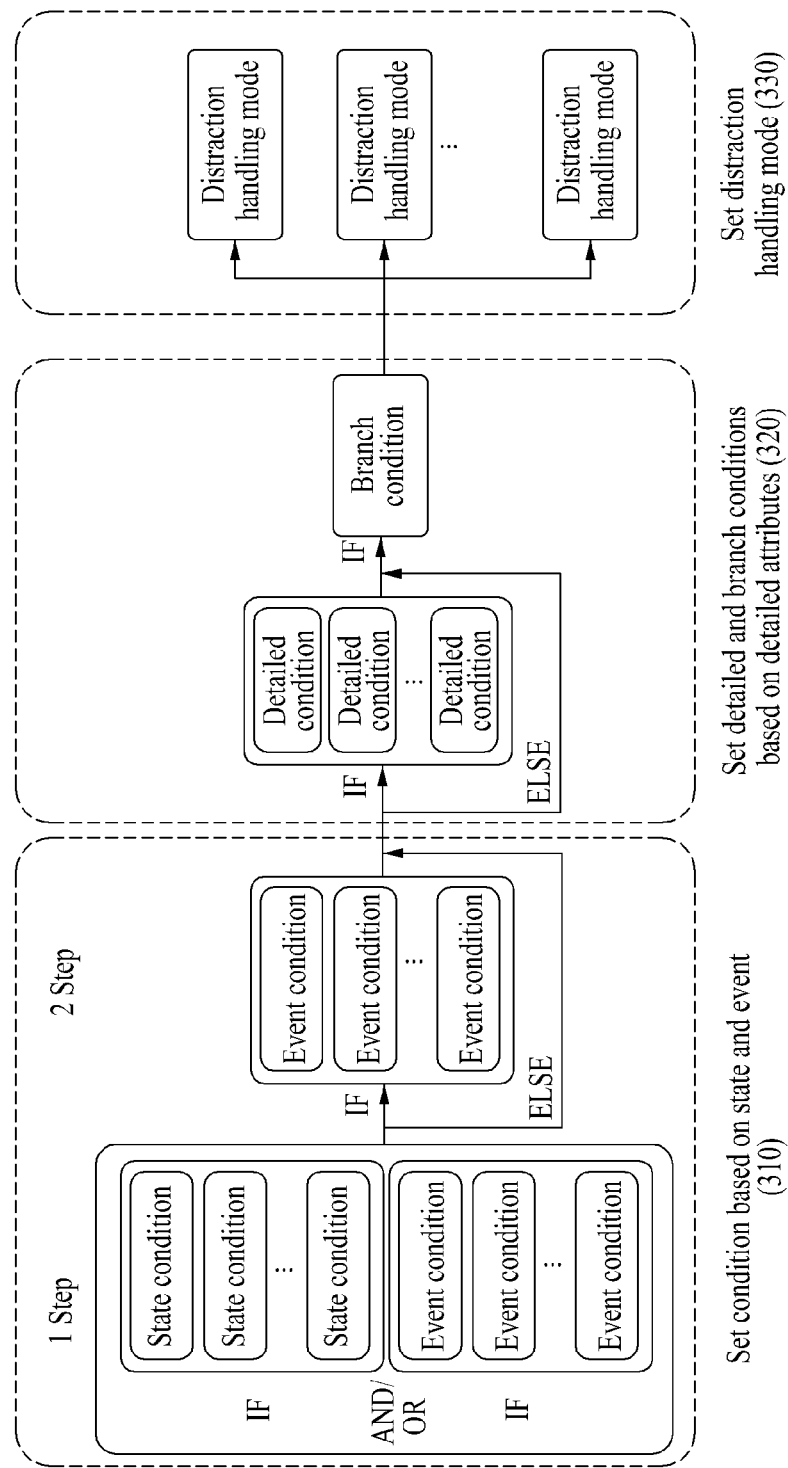
FIG. 3 is a diagram for describing a process of setting a condition in which a distraction management mode is applied according to an embodiment of the present disclosure.

FIG. 3 is a diagram for describing a process of setting a condition in which a distraction management mode is applied according to an embodiment of the present disclosure.

In the step of setting the condition in which the distraction management mode is applied, a user may select one or more context information items to which a distraction management mode is automatically applied, and may set a condition in each of the selected items (310). In this case, the context information item includes a state condition and an event condition.

The state condition means a context condition or environment condition related to the user. The state condition includes time, a place, an activity being performed by the user, an interaction state between the user and a smart device, the physical state of the smart device, the environment setting state of the smart device, and the social interaction state of the user. The state condition is defined by including timing at which the context condition or environment condition starts to be satisfied and timing at which the context condition or environment condition is no longer satisfied.

For example, if a state condition has been set as a library (i.e., place), timing from timing at which a user enters the library and to timing at which the user exits from the library is a context in which the corresponding state condition has been satisfied.

For another example, if a state condition has been set between 13 o'clock and 18 o'clock (i.e., time), timing from 13 o'clock at which a context condition is satisfied to 18 o'clock, that is, timing at which the context condition is no longer satisfied is a context in which the corresponding state condition has been satisfied.

The event condition, unlike the state condition, may be defined as timing at which an event or context occurs at specific timing.

For example, "if a user is in a library" may be defined as a state condition, but "the moment when a user enters the library" is an event condition indicative of timing at which the user enters the library not the state in which the user has been in the library.

The event condition may encompass the following condition: external notification or call is received by a smart device, the amount of the smart device used or frequency of use preset by a user is exceeded or the amount of application program (i.e., application) used or frequency of use preset by a user is exceeded.

A difference between the event condition and the context condition is as follows. The event condition is temporarily satisfied at specific timing, whereas in the state condition, the state in which a context condition set by a user has been satisfied continues, and the event condition is configured with a start point and an end point.

A user may set a condition in which a distraction management mode is applied by combining one item or two or more items among the specified states and events. The specified state condition and event condition may include detailed attributes. A user may set a detailed condition in which a distraction management mode is applied based on the detailed attributes (320).

For example, a user may set a distraction management mode to be applied "if the user has received external notification (i.e., event condition) and the sender of the notification is a specific person A (i.e., a detailed condition of the event condition)". If the user does not set a detailed condition "if the sender is a specific person A" of the event condition, the distraction management mode is applied when the external notification is received.

For yet another example, a user may set a distraction management mode to be applied "if the user has received external notification (i.e., event condition) and a specific keyword B is included in the notification (i.e., a detailed condition of the event condition)."

A user may set a branch condition in which a distraction management mode is differently applied based on a detailed condition using detailed attributes.

For example, a user may set a condition in which a "distraction management mode A is applied if the user has received external notification and the sender of the notification is a specific person A" and a "distraction management mode B is applied if the sender of the notification is a specific person B". If a user does not set a branch condition, one distraction management mode is applied regardless of detailed attributes of a state or event. Thereafter, the user may set a distraction action mode based on a branch condition (330).

In the step of setting the distraction management mode, the user may select a distraction management mode to be applied when the state condition or event condition set by the user at step 210 is satisfied.

Distraction management mode which may be set may include the following modes: (a) a mode in which system environment setting of a smart device is changed, (b) a mode in which a method of receiving external information received through a smart device is changed, (c) a mode in which restriction is applied to interactivity for the smart device of a user, and (d) a mode in which a user can be aware of a context.

(a) The mode in which system environment setting of a smart device is changed is a method of changing environment setting provided in a smart device, and may include the following method: control of the brightness of a screen of a smart device, control of the volume generated in a smart device, a change in the interface of a smart device, and a change in the sound mode.

(b) The mode in which a method of receiving external information received through a smart device is changed means changing a method of processing external information or contact including a call or notification, and may include the following method: not delivering received information or contact to a user, processing as silence, processing as vibration, and automatically transmitting a response to a sender.

(c) The mode in which restriction is applied to interactivity for the smart device of a user may include a method of preventing a user from using a smart device or limitedly allowing a user to use a smart device: impossible unlocking of a smart device, blocking all application programs (i.e., application), blocking only a specific application program, allowing only a specific application program, and blocking a network connection.

(d) The mode in which a user can be aware of a context is a method of allowing a user to be aware of a current context and to concentrate or immerse in an activity to be performed by providing the user with information related to the current context. The information related to the current context for the user may include a method of displaying the information on the entire screen or part of the screen of a smart device. For example, when a student attempts to execute an application program for a fun while taking classes, a sentence "you may be better to focus on the classes because the classes are now ongoing" may be output.

A user may select the specified distraction management mode. If a branch condition in which a distraction management mode is applied based on detailed attributes of the state condition or event condition has been set at step 210, a distraction management mode may be differently applied every branched condition.

In the step 230 of setting the condition in which the distraction management mode is released, a user may set a condition for returning the state in which distraction management mode setting has been applied to the state before the distraction management mode was applied.

A user may set a condition in which a distraction management mode is released using a state condition and an event condition. The condition for releasing the distraction management mode may encompass (a) a temporary release condition and (b) a full release condition.

(a) The temporary release condition means that a distraction management mode has been set because a set state condition or event condition is satisfied, but the distraction management mode is "temporarily" released. After the temporary release, the distraction management mode is set again. The temporary release condition may encompass that a user performs a specific task using a smart device. For example, a condition in which a distraction management mode is temporarily released when a "randomly long character string is entered" in the state in which a distraction management mode in which an application program A cannot be executed has been applied may be set. In order to satisfy the temporary release condition, a user may enter a randomly long character string in an interface provided by a system and then temporarily use the application program A. After the use of the application program A is ended, the distraction management mode in which the application program A cannot be executed is applied again.

(b) The full release condition means that a distraction management mode is no longer applied and "fully" released in the state in which a distraction management mode has been set because the state condition or event condition set at step 210 is satisfied. The full release condition may be set by encompassing a method of directly specifying, by a user, a condition in which a distraction management mode is released and a method of defining, as a release condition, a context whose state condition set at step 210 is no longer satisfied. The method of separately specifying, by a user, a condition in which a distraction management mode is released may include a method of specifying a condition using a state and event as in the method of specifying a condition at step 210 and a method of separately specifying, by a user, time during which a distraction management mode is maintained (e.g., the use of an application program A is prohibited for 30 minutes).

The method of defining, as a release condition, a context whose state condition set at step 210 is no longer satisfied means a case where a distraction management mode is automatically released when a set state condition is no longer satisfied. For example, if the state "the user is in the library" at step 210 has been set as a single condition, a distraction management mode is set when the user enters the library, but a distraction management mode is fully released if the user exits from the library and the state in which "the user is in library" is no longer satisfied.

In the step 240 of verifying the condition for applying or releasing the distraction management mode and delivering a result of the verification to the user, a system verifies the condition for applying or releasing the distraction management mode, set by the user in a previous step, and induces the user to set a correct rule.

A condition for applying or releasing a distraction management mode, set by a user, may not be proper. For example, a user may set a rule on which "when the user arrives at a library (event because a context whose condition is ended has not been specified)" and "the user receives notification (event)", the corresponding notification will be received as silence. However, timing at which the user arrives at the library and timing at which the notification is received cannot occur at the same time. Accordingly, in such a condition, a system needs to provide information to the user so that the user can modify a rule into the rule "when the user is in the library (i.e., state)" and "the user receives notification (i.e., event)."

A user may not set a condition in which a distraction management mode is released. For example, a user may set a rule "all contacts are not received after wakeup alarm is set after 11 p.m." In such a case, the user cannot continuously receive contacts unless the releases a distraction management mode. If a separate manipulation is not performed in order to release a distraction management mode, a situation in which the user misses an important contact may occur.

For yet another example, if a rule "when a class starts, a smartphone screen cannot be unlocked" has been set, although the class is ended, a user has to perform a separate manipulation in order to release a distraction management mode because a condition in which the distraction management mode is released has not been specified. Accordingly, inconvenience may occur.

For yet another example, likewise, if a rule "when a meeting starts, an incoming call is automatically rejected and an automated response is transmitted" has been set, received calls continue to be rejected and an automated response is transmitted to a sender unless a user performs a separate manipulation after the meeting is ended. Accordingly, inconvenience may occur because erroneous information is transmitted to the sender.

As described above, if a condition in which a distraction management mode is released is not set, the distraction management mode continues to be in a set state although a context becomes a context not requiring a distraction management mode. Accordingly, inconvenience for a user can be reduced.

Accordingly, at step 240, a system may suggest the user to modify and modify the rule set by the user if the rule needs to be modified by reviewing and simulating the rule.

Figure 4:
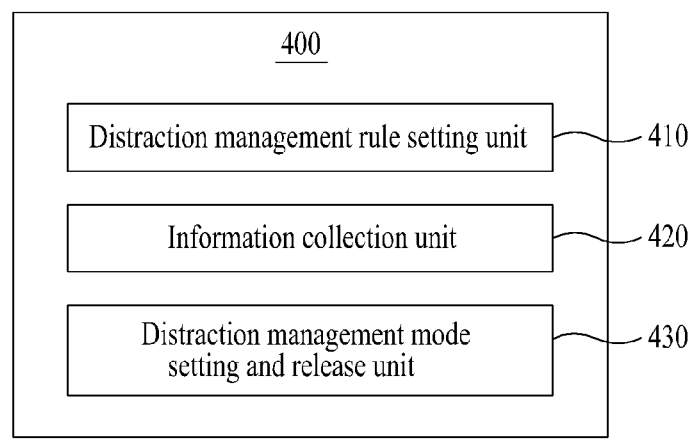
FIG. 4 is a diagram illustrating the configuration of an apparatus for managing a distraction to a smart device based on a context-aware rule according to an embodiment of the present disclosure.

FIG. 4 is a diagram illustrating the configuration of an apparatus for managing a distraction to a smart device based on a context-aware rule according to an embodiment of the present disclosure.

The apparatus 400 for managing a distraction to a smart device based on a context-aware rule includes a distraction management rule setting unit 410, an information collection unit 420 and a distraction management mode setting and release unit 430.

The distraction management rule setting unit 410, the information collection unit 420 and the distraction management mode setting and release unit 430 may be configured to perform steps 110~150 of FIG. 1.

The distraction management rule setting unit 410 sets a context-aware distraction management rule. The distraction management rule setting unit 410 sets a condition in which the distraction management mode is applied by selecting one or more context information items to which the distraction management mode is automatically applied and setting a condition in each of the selected items. The distraction management rule setting unit selects a distraction management mode to be applied when the set condition is satisfied, a condition in which the distraction management mode is released, for returning the state in which the selected distraction management mode is applied to the state before the selected distraction management mode was applied, verifies the condition for applying or releasing the distraction management mode, and delivers a result of the verification to a user.

In this case, the context information item includes a state condition or an event condition. The state condition or the event condition includes detailed attributes. A detailed condition in which the distraction management mode is applied is set based on the detailed attributes. A branch condition in which the distraction management mode is differently applied is set based on the detailed condition.

The information collection unit 420 collects context information for applying the distraction management mode and releasing the distraction management mode using the set context-aware distraction management rule.

The distraction management mode setting and release unit 430 determines whether to set or release the distraction management mode and sets and releases the distraction management mode.

The distraction management mode setting and release unit 430 determines whether the collected context information for applying a distraction management mode and the condition in which a distraction management mode based on the set distraction management rule is applied are the same. The distraction management mode setting and release unit maintains the step of collecting context information for applying the distraction management mode when the collected context information and the condition are not the same, and sets the distraction management mode when the collected context information and the condition are the same.

The distraction management mode setting and release unit 430 determines whether the collected context information for releasing the distraction management mode and the condition in which the distraction management mode based on the set distraction management rule is released are the same. The distraction management mode setting and release unit maintains the step of collecting context information for releasing the distraction management mode when the collected context information and the condition are not the same, and releases the distraction management mode when the collected context information and the condition are the same.

Figure 5:
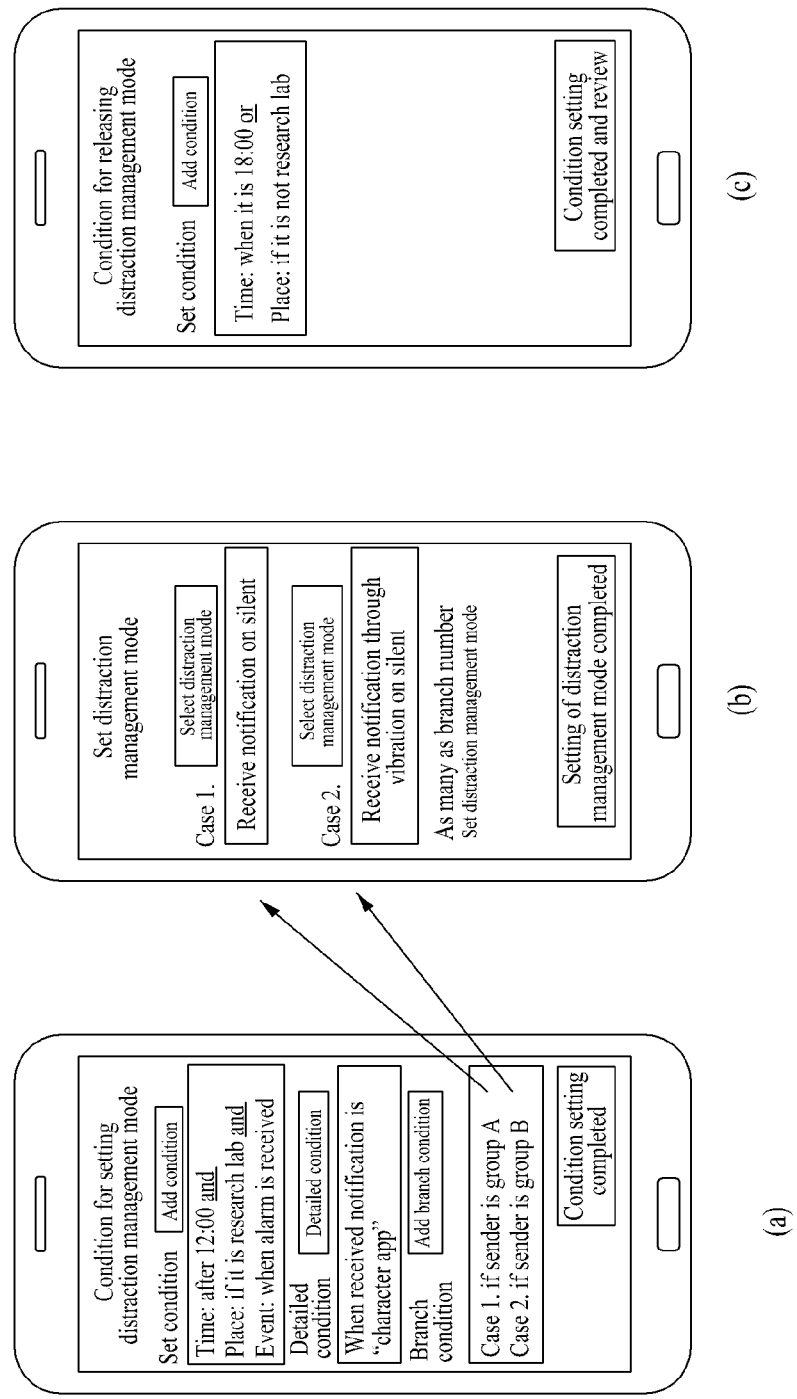
FIG. 5 is a diagram for describing an example of distraction management rule setting using a user interface using a graphic function according to an embodiment of the present disclosure.

FIG. 5 is a diagram for describing an example of distraction management rule setting using a user interface using a graphic function according to an embodiment of the present disclosure.

FIG. 5(*a*) illustrates a condition for setting a distraction management mode. A detailed condition and branch condition according to the set condition (e.g., time, place and event) is set.

FIG. 5(*b*) illustrates distraction management mode setting. A distraction management mode is selected based on the set branch condition.

FIG. 5(*c*) illustrates a condition for releasing a distraction management mode. A condition (e.g., time, place) in which the distraction management mode is released, for returning the state in which the selected distraction management mode is applied to the state before the selected distraction management mode was applied is set. The conditions for applying and releasing the distraction management mode are verified and delivered to a user.

FIG. 6 is a diagram for describing an example in which information is presented to a user after a distraction management rule is reviewed according to an embodiment of the present disclosure.

As illustrated in FIGS. 6(*a*) and 6(*b*), after a distraction management rule set by a user is reviewed, the user may be suggested to modify and supplement the rule if it is determined that the rule needs to be modified through simulations.

According to an embodiment of the present disclosure, a user may directly set a desired "context-aware-based distraction management rule." A system automatically executes a distraction management mode based on the distraction management rule set by the user. Accordingly, the user can effectively handle a distraction which may occur due to a smart device without inconvenience in directly changing the setting of the smart device in a situation in which concentration/immersion are necessary.

A system supports a user to finely and flexibly set a distraction management rule. In this case, a distraction element of a variety of types of information received by a smart device can be blocked, and important information that needs to be aware among the variety of types of information can be selectively received. Furthermore, the smart device can be used suitably for a purpose in an exceptional situation in which the smart device needs to be used. Accordingly, the user can effectively block only a distracted element while using a proper function unique to the smart device without any change and maintaining high productivity.

A system simulates a rule set by a user and displays the results, that is, information, to the user. Accordingly, the user can accurately understand an operation method of a distraction management rule set by the user, and can be clearly aware of when a distraction management mode is automatically set and released.

Furthermore, the system can simulate whether a rule set by the user will correctly operate in a field, and can suggest the user to modify the rule if a logical defect is present. The user may accept the suggestion and supplement the distraction management rule set by the user.

In this case, the possibility that the distraction management rule will not correctly operate can be removed because a situation in which the distraction management rule may operate contrary to the user's expectations.

The aforementioned apparatus may be implemented in the form of a combination of hardware elements, software elements and/or hardware elements and software elements. For example, the apparatus and elements described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. The processing device may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may be aware that the processor may include a plurality of processing elements and/or a plurality of types of processing elements. For example, the processor may include a plurality of processors or a single processor and a single controller. Furthermore, other processing configurations, such as a parallel processor, are also possible.

Software may include a computer program, code, an instruction or a combination of one or more of them and may configure the processor so that it operates as desired or may instruct the processor independently or collectively. The software and/or data may be embodied in a machine, component, physical device, virtual equipment or computer storage medium or device of any type or a transmitted signal wave permanently or temporarily in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may be known to those skilled in computer software. The computer-readable recording medium includes a hardware device specially configured to store and execute the program instruction, for example, magnetic media such as a hard disk, a floppy disk, and a magnetic tape, optical media such as CD-ROM or a DVD, magneto-optical media such as a floptical disk, ROM, RAM, or flash memory. Examples of the program instruction may include both machine-language code, such as code written by a compiler, and high-level language code executable by a computer using an interpreter.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The embodiments of the invention in which an exclusive property or privilege is claimed are defined as follows:

1. A method of managing a distraction to a smart device based on a context-aware rule, the method comprising steps of:

setting a context-aware distraction management rule, wherein the step of setting the context-aware distraction management rule comprises steps of:

setting a condition in which a distraction management mode is applied by selecting one or more context information items to which the distraction management mode is automatically applied and setting a condition in each of the selected items;

selecting a distraction management mode to be applied when the set condition is satisfied;

setting a condition in which the distraction management mode is released, for returning a state in which the selected distraction management mode has been applied to a state before the selected distraction management mode was applied; and verifying the condition in which the distraction management mode is released and the condition in which a distraction management mode is applied and transmitting a result of the verification to a user, including automatically simulating operation of the condition in which the distraction management mode is released and the condition in which a distraction management mode is applied to identify any logical defects, and suggesting a modification to the condition in which the distraction management mode is released or the condition in which a distraction management mode is applied if a logical defect is present;

collecting context information for applying a distraction management mode based on the set context-aware distraction management rule;

determining whether to set a distraction management mode and setting the distraction management mode based on the context-aware distraction management rule and the context information for applying the distraction management mode, wherein the context information for applying the distraction management mode comprises an indication of whether the smart device is in a physical separation state from the user, and wherein the indication of whether the smart device is in the physical separation state is inferred based on communication between the smart device and a device worn by the user;

collecting context information for releasing the set distraction management mode; and determining whether to release the setting of the distraction management mode and releasing the distraction management mode.

2. The method of claim 1, wherein:
in the step of setting the condition in which the distraction management mode is applied, the context information item comprises one or more state conditions or event conditions,
the state condition or event condition comprises detailed attributes,
a detailed condition in which the distraction management mode is applied is set based on the detailed attributes, and
a branch condition in which the distraction management mode is differently applied is set based on the detailed condition.

3. The method of claim 1, wherein the step of determining whether to set the distraction management mode and setting the distraction management mode comprises:
determining whether the collected context information for applying the distraction management mode and the condition in which the distraction management mode based on the set distraction management rule is applied are identical,
maintaining the step of collecting context information for applying the distraction management mode when the collected context information and the condition are not identical, and
setting the distraction management mode when the collected context information and the condition are identical.

4. The method of claim 1, wherein the step of determining whether to release the setting of the distraction management mode and releasing the distraction management mode comprises:
determining whether the collected context information for releasing the distraction management mode and the condition in which the distraction management mode based on the set distraction management rule is released are identical,
maintaining the step of collecting context information for releasing the distraction management mode when the collected context information and the condition are not identical, and
releasing the distraction management mode when the collected context information and the condition are identical.

5. An apparatus for managing a distraction to a smart device based on a context-aware rule, the apparatus comprising:
a distraction management rule setting unit setting a context-aware distraction management rule, wherein the distraction management rule setting unit
sets a condition in which a distraction management mode is applied by selecting one or more context information items to which the distraction management mode is automatically applied and setting a condition in each of the selected items,
selects a distraction management mode to be applied when the set condition is satisfied,
sets a condition in which the distraction management mode is released, for returning a state in which the selected distraction management mode has been applied to a state before the selected distraction management mode was applied, and
verifies the condition in which the distraction management mode is released and the condition in which a distraction management mode is applied and transmitting a result of the verification to a user and transmits a result of the verification to a user, including automatically simulating operation of the condition in which the distraction management mode is released and the condition in which a distraction management mode is applied to identify any logical defects, and suggesting a modification to the condition in which the distraction management mode is released or the condition in which a distraction management mode is applied if a logical defect is present;

an information collection unit collecting context information for applying a distraction management mode based on the set context-aware distraction management rule; and a distraction management mode setting and release unit determining whether to set and release a distraction management mode and setting and releasing the distraction management mode, wherein setting the distraction management mode is based on the context-aware distraction management rule and the context information for applying the distraction management mode, wherein the context information for applying the distraction management mode comprises an indication of whether the smart device is in a physical separation state from the user, and wherein the indication of whether the smart device is in the physical separation state is inferred based on communication between the smart device and a device worn by the user.

6. The apparatus of claim 5, wherein:
the context information item comprises one or more state conditions or event conditions,
the state condition or event condition comprises detailed attributes, a detailed condition in which the distraction management mode is applied is set based on the detailed attributes, and a branch condition in which the distraction management mode is differently applied is set based on the detailed condition.

7. The apparatus of claim 5, wherein the distraction management mode setting and release unit determines whether the collected context information for applying the distraction management mode and a condition in which the distraction management mode based on the set distraction management rule is applied are identical, maintains collecting context information for applying the distraction management mode when the collected context information and the condition are not identical, and sets the distraction management mode when the collected context information and the condition are identical.

8. The apparatus of claim 5, wherein the information collection unit collects context information for releasing the distraction management mode, and wherein the distraction management mode setting and release unit determines whether the collected context information for releasing the distraction management mode and a condition in which the distraction management mode based on the set distraction management rule is released are identical, maintains collecting context information for releasing the distraction management mode when the collected context information for releasing the distraction management mode and the condition are not identical, and releases the distraction management mode when the collected context information for releasing the distraction management mode and the condition are identical.

\* \* \* \* \*